(12) United States Patent
Luzzi (10) Patent No.: US 8,502,076 B2
(45) Date of Patent: Aug. 6, 2013

(54) COLD SHRINKABLE SECONDARY SPLICE

(75) Inventor: Glenn J. Luzzi, Mt. Bethel, PA (US)

(73) Assignee: Richards Manufacturing Company, Irvington, NJ (US)

( * ) Notice: Subject to any disclaimer, the term of this patent is extended or adjusted under 35 U.S.C. 154(b) by 392 days.

(21) Appl. No.: 12/964,924

(22) Filed: Dec. 10, 2010

(65) Prior Publication Data

US 2011/0180323 A1    Jul. 28, 2011

Related U.S. Application Data

(60) Provisional application No. 61/297,337, filed on Jan. 22, 2010.

(51) Int. Cl.
*H02G 15/18*     (2006.01)
(52) U.S. Cl.
USPC ............................................................ 174/93
(58) Field of Classification Search
USPC ........................................ 174/73.1, 93, 88 R
See application file for complete search history.

(56) References Cited

U.S. PATENT DOCUMENTS

| | | | | |
|---|---|---|---|---|
| 4,019,250 | A * | 4/1977 | Bassett et al. | 29/877 |
| 6,245,999 | B1 * | 6/2001 | Costigan et al. | 174/74 A |
| 6,359,226 | B1 * | 3/2002 | Biddell et al. | 174/74 A |
| 6,472,600 | B1 * | 10/2002 | Osmani et al. | 174/75 R |
| 7,511,222 | B2 * | 3/2009 | Taylor et al. | 174/84 R |
| 2008/0121408 | A1 * | 5/2008 | Portas et al. | 174/73.1 |

* cited by examiner

*Primary Examiner* — Chau Nguyen
(74) *Attorney, Agent, or Firm* — Lowenstein Sandler LLP (57) ABSTRACT

An insulating system for splicing a pair of cables having at least partially exposed non-insulating portions joined with a metallic connector is disclosed. The insulating system includes an insulating tube constructed from a shape memory material having a central section having a substantially elliptical cross-section and a pair of end sections with substantially circular cross-sections. A pair of support cores is removably insertable in each of the end sections for holding the end sections in a stretched configuration. When the insulating system is placed about the cables and the connector and the support cores are removed from the end sections, the end sections return to a pre-stretched configuration, thereby completing a splice of the cables.

32 Claims, 11 Drawing Sheets

FIG. 1B

Section A-A

Detail B

COLD SHRINKABLE SECONDARY SPLICE

CROSS-REFERENCE TO RELATED APPLICATIONS

This application claims the benefit of U.S. Provisional Patent Application No. 61/297,337 filed Jan. 22, 2010, the disclosure of which is incorporated herein by reference in its entirety.

FIELD OF THE INVENTION

The present invention relates generally to cabling systems and connections, and more particularly, to a system and method for employing cold shrinkable materials for performing splicing on secondary cables.

BACKGROUND OF THE INVENTION

There is a need in several industries for splicing together two or more insulated cables containing solid or stranded wire. One such industry is the power transmission industry, which employs a myriad array of types of cables for different distribution needs. One such cable type used for low voltage distribution lines is secondary cable. As used herein "secondary cable" is intended to include cables configured to operate at about 600 volts or less and to be deployed on a low voltage side of a distribution transformer in an electrical distribution system. The secondary cable comprises one or more conductors encased in some form of insulation. In contrast, as used herein, "primary cable" is intended to include cables configured to operate at or above 8 kV and to be deployed on a high voltage side of a distribution transformer in an electrical distribution system. The secondary cable comprises one or more conductors encased in some form of insulation. Primary cable includes both insulating and semi-conductive layers having the following construction: conductor, semi-conducting material, insulating material, semi-conductive layer, metallic shield.

Splicing secondary cables together or secondary cables to a multi-way joint, such as a crab joint, requires a metallic connector to join two conductors together and an insulation system to prevent energized conductors from shorting to adjacent cables or to ground or from creating stray voltages to surrounding objects. In practice, the insulation system of a secondary splice should be approximately 10 inches in length to cover the connector and provide sufficient overlap of the cable ends. It is further desirable that the insulation system have the following properties: provide insulation over any exposed conductor and connector; provide a water-tight seal between itself and underlying cable insulation such that environmental water cannot reach a spliced cable conductor or a metallic connector; be sufficiently tough to prevent typical external abrasion from damaging the insulating or sealing characteristics of a splice; conduct heat generated in a conductor/connector to the external environment sufficiently to permit a completed splice to operate at or below the temperature of the bulk cable; and, be sufficiently easy to install by a splicer to minimize chances for installation errors.

There are many prior art insulation systems methods currently available. Among these are insulating tape, interference fit push on, heat shrinkable materials, and cold shrinkable materials. The corresponding method for creating a splice using each type of insulating system is described hereinbelow.

After two cables are joined with a connector, electrical tape may be layered over the connector and a portion of the cable insulation. Drawbacks to employing electrical tape and its splicing method include the large amount of time necessary to construct the splice and the necessary high skill level of the splicer to construct an adequate splice.

To perform a splice with an interference fit push-on insulation system, prior to connecting the cables with a connector, a push-on housing is stored onto one of the cables. After a connector is installed, the push-on housing is positioned over the connector and cable ends. Drawbacks to employing this method include a large installation force necessary to store and position the housing. It is also difficult to seal the splice if there are any protrusions such as phase markers or dips in the cable insulation surface from damage.

To perform a splice with heat shrinkable materials, prior to connecting the cables with a connector, an expanded heat shrinkable tube or tubes is stored onto one of the cables. After a connector is installed, the heat shrinkable tube is slid back over the connector and cable ends. With the application of heat, the tube is reduced in size until it shrinks completely in place. To provide adequate sealing to the cable ends, the insulating tube is provided with an adhesive on the inside that is activated by applied heat. Drawbacks to this method include the use of a potentially dangerous torch. High skill levels are required to ensure that the heat shrinkable tube(s) uniformly and adequately shrink and that sufficient heat is used to activate a sealing materials but not too large an amount of heat to damage any materials or the cable insulation.

To perform a splice with cold shrinkable materials, prior to connecting the cables with a connector, an expanded cold shrinkable tube is stored onto one of the cables. After a connector is installed, the cold shrinkable tube is slid back over the connector and cable ends. A support core is removed from one end (or removed from each end in the case of a two-piece support core), thereby permitting the insulating housing to constrict over the connector and cable ends. The support tube(s) may be solid-type cores, spiral cores, or friable cores. Again, a sealing material is needed to provide a proper environmental sealing. Sealing materials are typically of a putty consistency such a butyl. The putty is usually applied to the cable insulation ends prior to pulling the expanded tube into position. As a result of foreseeable workmanship mistakes, it is desirable to pre-install the putty under the removable core. Unfortunately, maintaining the position of the putty during core removal is problematic. Another drawback to employing cold shrinkable materials using existing installation methods includes the need to use long lengths of support cores, which may be time consuming for a splicer to remove or may create an ergonomic issue when trying to unwind such long support cores.

When spiral cores are employed in connection with cold shrinkable materials, as the core(s) is (are) removed, they must be unwound to prevent jamming. It is difficult to keep mastic (i.e., putty) in place if included under a pre-stretched cold shrinkable tube. Further, if mastic is supplied and installed separately, there is a high risk it would inadvertently be left out of the installation. Still further, spiral cores require the shrinkable tube to be expanded sufficiently to allow easy removal of the core. In designs that employ a central, non-removable support core and only short spiral cores on the ends, a workable method of removing heat from the connector is desirable, since there would be an air space left between the non-removed support core and the connector.

When solid cores are employed in connection with cold shrinkable materials, the cold shrinkable tube does not need to be expanded as much as the spiral support core, since the support core is pulled back from one or both ends (i.e., solid cores do not require as much clearance between the cable, connector, and inside diameter of the support core). Further, an auxiliary film needs to be installed between the shrinkable tube and the support core to aid in easy removal. A splicing method that employs solid cores lends itself to the application of pre-installed sealing mastic pre-installed. Unfortunately, the significantly long length of solid cores renders them difficult to remove if there is insufficient space in the splice compartment, even when a mylar release material is employed.

Accordingly, what would be desirable, but has not yet been provided, is a system and method for employing cold shrinkable materials for performing splices on secondary cables that overcome the deficiencies in the prior art described hereinabove.

SUMMARY OF THE INVENTION

The above-described problems are addressed and a technical solution is achieved in the art by providing an insulating system for splicing a pair of cables having at least partially exposed non-insulating portions joined with a metallic connector, comprising: an insulating tube constructed from a shape memory material having a central section having a substantially elliptical cross-section and a pair of end sections with substantially circular cross-sections; and a pair of support cores removably insertable in each of the end sections for holding the end sections in a stretched configuration, wherein, when the insulating system is placed about the cables and the connector and the support cores are removed from the end sections, the end sections return to a pre-stretched configuration, thereby completing a splice of the cables.

According to an embodiment of the present invention, the support cores may be substantially circular in cross section. According to an embodiment of the present invention, wherein the support cores are configured to have a combined length that is substantially shorter than the insulating tube. An inside circumference of the elliptically shaped central section of the insulating tube is substantially the same as an outside circumference of the support cores.

According to an embodiment of the present invention, the shape memory material may comprise a form of rubber, which may be Ethylene-propylene-diene-monomer (EPDM) or silicone or both.

According to an embodiment of the present invention, the support cores may have a substantially smooth shape configured to be friction fit into the end sections. A film layer may be inserted between corresponding ends of the support cores and a corresponding end section. The film is configured to be folded back on itself to form an inner film layer adjacent to the corresponding ends of the support cores and to form an outer film layer adjacent to the corresponding end section with the adhesive. The inner film layer may be adhered to the corresponding end of the support cores with an adhesive. The film comprises a plastic, preferably mylar.

According to an embodiment of the present invention, the support cores may be configured to be wound into the end sections.

According to an embodiment of the present invention, an end section comprises a hollow lip extending about a portion of an inner circumference of the end section. The insulating system may further comprise a sealant material configured to be received between each of the support cores and the insulating tube.

According to an embodiment of the present invention, a method for splicing a pair of cables with a connector and having at least partially exposed non-insulating portions that are joinable with the connector is disclosed. The method comprises the steps of: providing an insulating system comprising an insulating tube constructed from a shape memory material having a central section having a substantially elliptical cross-section and a pair of end sections with substantially circular cross-sections and a pair of support cores removably insertable in each of the end sections for holding the end sections in a stretched configuration; placing the insulating system about the cables and the connector; and removing the support cores from the end sections, wherein the end sections return to a pre-stretched configuration, thereby completing a splice of the cables.

According to an embodiment of the present invention, when the support cores are removed from the end sections, a sealant material is trapped between each of the insulated portions of the cables and a corresponding end section, thereby providing an environmental seal for the spliced cables. When the support cores have a substantially smooth shape and a film layered between a corresponding one of the support cores and a corresponding one of the end sections, the film is configured to be folded back on itself, and when a support core is removed, a portion of the film in contact with the support core slips out. The sealant material remains in place as the film slips out. When the support cores have a substantially spiral shape, they may be unwound when removed from the end sections.

BRIEF DESCRIPTION OF THE DRAWINGS

The present invention will be more readily understood from the detailed description of exemplary embodiments presented below considered in conjunction with the attached drawings in which like reference numerals refer to similar elements and in which.

It is to be understood that the attached drawings are for purposes of illustrating the concepts of the invention and may not be to scale.

DETAILED DESCRIPTION OF THE INVENTION

Figure 1A:
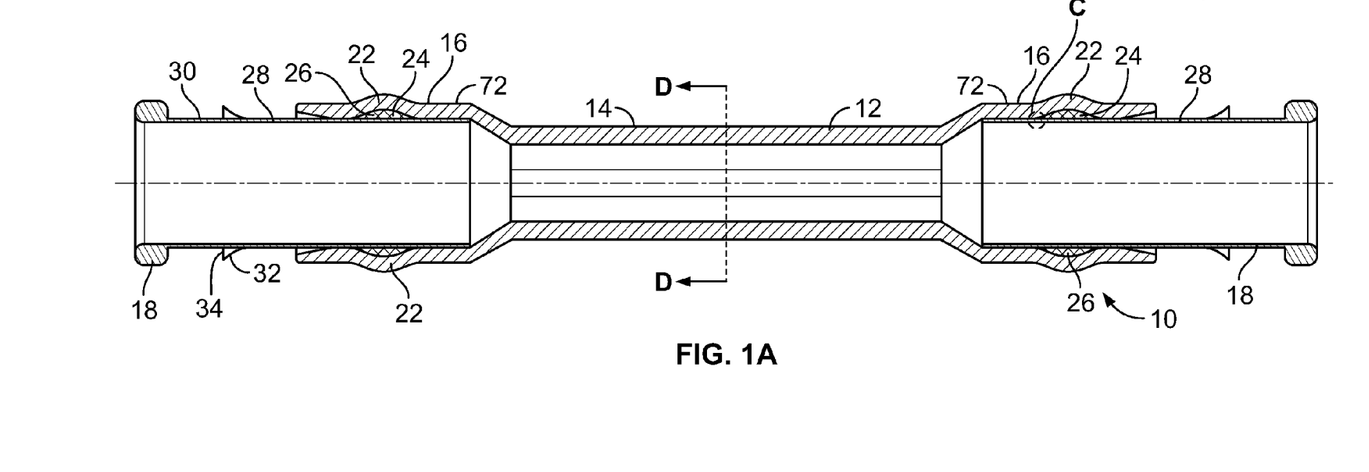
FIG. 1A depicts a plurality of assembled views of a cold-shrinkable splice insulating system having solid support cores, according to an embodiment of the present invention.
Figure 1B:
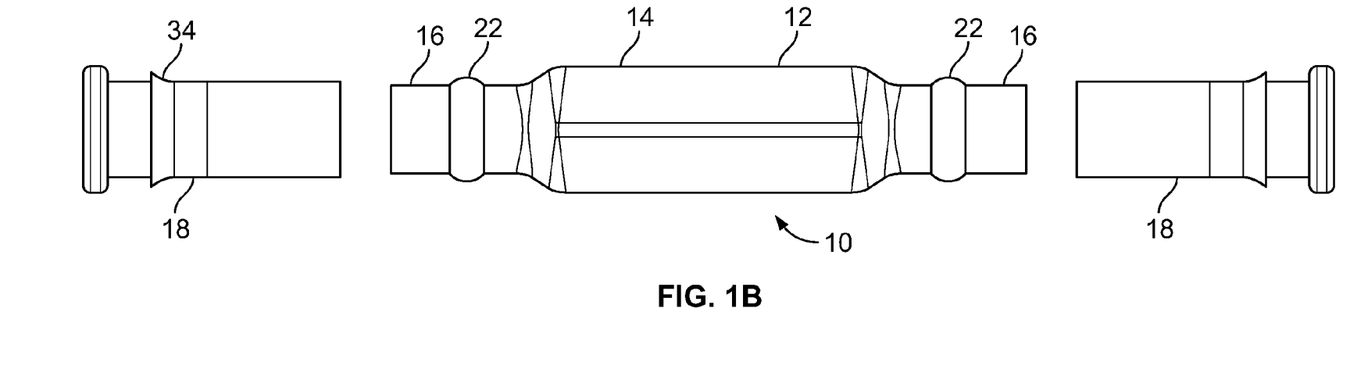
FIG. 1B shows an exploded view of the insulating system of FIG. 1A, according to an embodiment of the present invention.
Figure 2A:
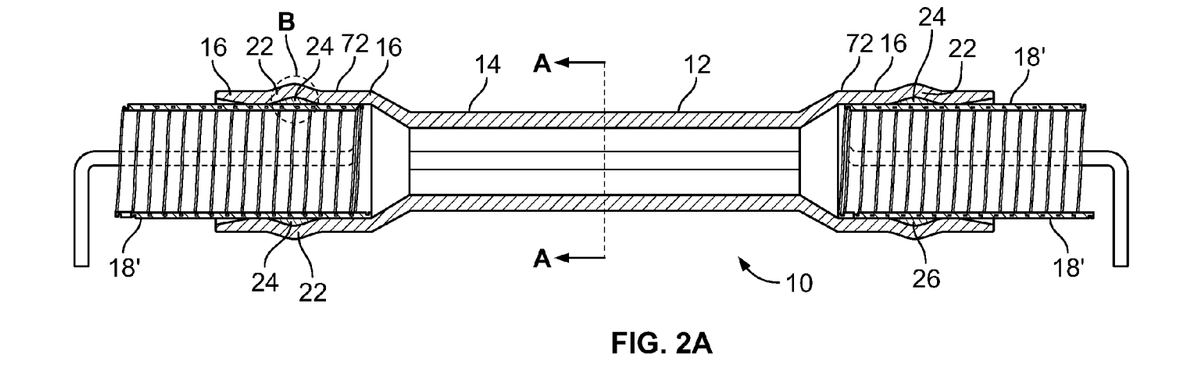
FIG. 2A depicts a plurality of assembled views of a cold-shrinkable splice insulating system having substantially spiral-shaped support cores, according to an embodiment of the present invention.
Figure 2B:
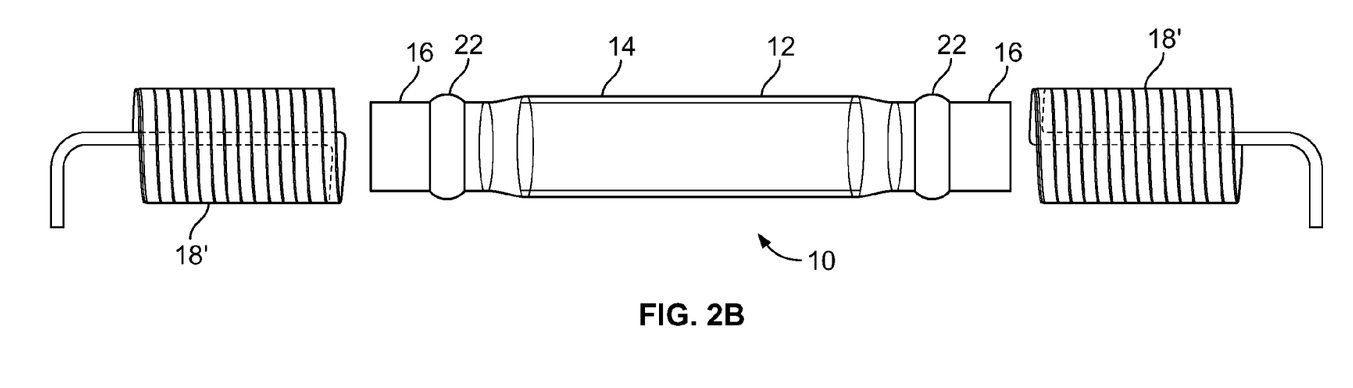
FIG. 2B shows an exploded view of the insulating system of FIG. 2A, according to an embodiment of the present invention.

FIG. 1A depicts a plurality of assembled views of a cold-shrinkable splice insulating system 10 having solid support cores 18; FIG. 1B shows an exploded view of the insulating system 10 of FIG. 1A; FIG. 2A depicts a plurality of assembled views of a cold-shrinkable splice insulating system 10 having substantially spiral-shaped support cores 18'; and FIG. 2B shows an exploded view of the insulating system 10 of FIG. 2A, according to an embodiment of the present invention. Referring now to FIGS. 1A-2B, the insulating system 10 comprises a hollow insulating tube 12. The insulating tube 12 includes a central section 14 having a substantially elliptical cross-section and a pair of end sections 16 having a substantially circular cross-section. Each of the end sections 16 is constructed from a shape memory material. In a preferred embodiment, the shape memory material may comprise a form of rubber, such as Ethylene-propylene-diene-monomer (EPDM) or silicone.

The insulating system 10 further includes a pair of hollow support cores 18 that are removably insertable in each of the end sections 16. In one embodiment, the support cores 18 (i.e., the solid cores 18) are substantially circular in cross section having a substantially smooth shape and configured to be friction fit into the end sections 16 (See FIGS. 1A and 1B). In another embodiment, the support cores 18' (i.e., the spiral cores 18') are substantially circular in cross section having a substantially spiral shape configured to be wound into the end sections 16 (See FIGS. 2A and 2B). Note: initially, each of the end sections 16 have a substantially smaller cross-section (diameter) before the support cores 18, 18' are inserted. According to an embodiment of the present invention, a hollow lip 22 is formed in each of the end section 16 because of the presence of a sealant material 26 (e.g., mastic). Under normal conditions, each of the end sections 16 is molded in a straight configuration. In an alternative embodiment, the hollow lip 22 is preformed in each end section 16 extending about a portion of an inner circumference 24 of the end section 16.

The lip 22 is operable to receive a sealant material 26 (e.g., mastic) between each of the support cores 18, 18' and the insulating tube 12. For the embodiment of FIG. 1A and 1B, having solid cores 18, a film 28, preferably comprising a plastic, e.g., mylar, is configured to be layered between each of the solid cores 18 and a corresponding one of the end sections 16. The film 28 is configured to be folded back on itself to form an inner film layer 30 adjacent and adhered to the corresponding solid core 18 with an adhesive on an end (not shown), and to form an outer film layer 32 adjacent to a corresponding end section 16. A portion of the outer film layer 32 may extend from a portion of a surface 34 of the inner film layer 30.

Figure 4A:
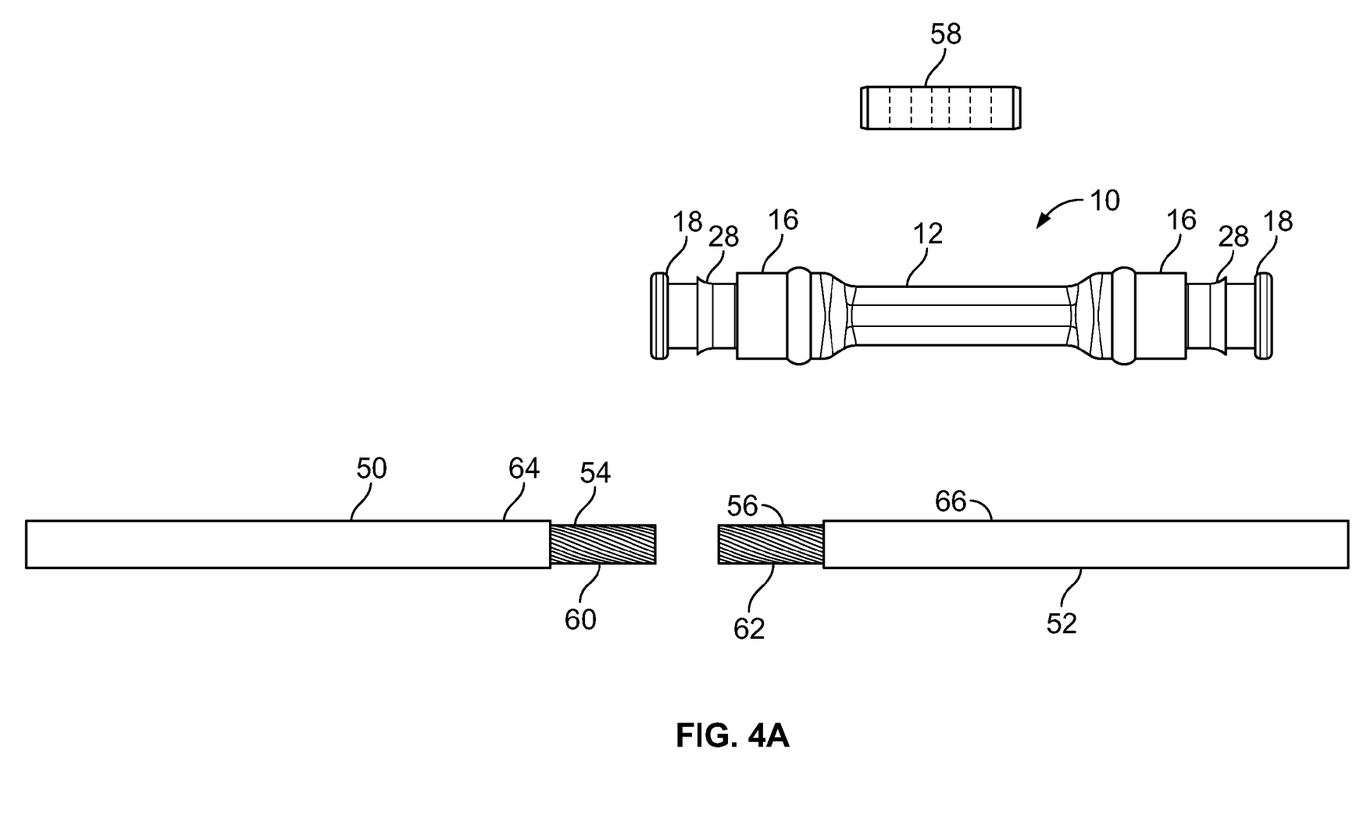
FIGS. 4A-4F are a series of assembly diagrams illustrating the corresponding steps of FIG. 3 for the cold-shrinkable splice insulating system employing the solid support cores of FIGS. 1A-1B, according to an embodiment of the present invention; and, FIGS. 5A-5F are a series of assembly diagrams illustrating the corresponding steps of FIG. 3 for the cold-shrinkable splice insulating system employing the spiral support cores of FIGS. 2A-2B, according to an embodiment of the present invention.
Figure 4B:
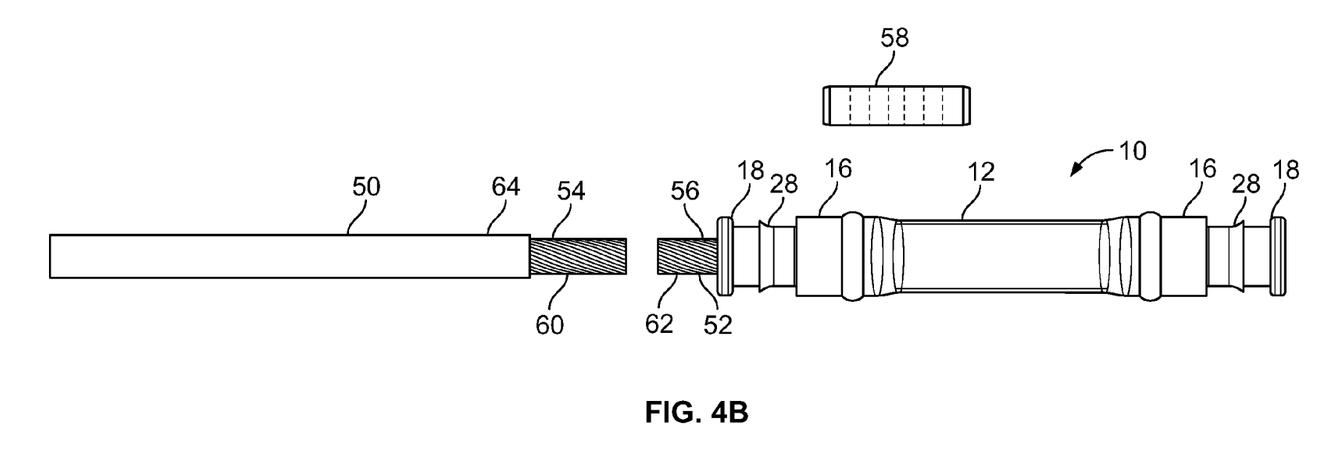
Figure 4C:
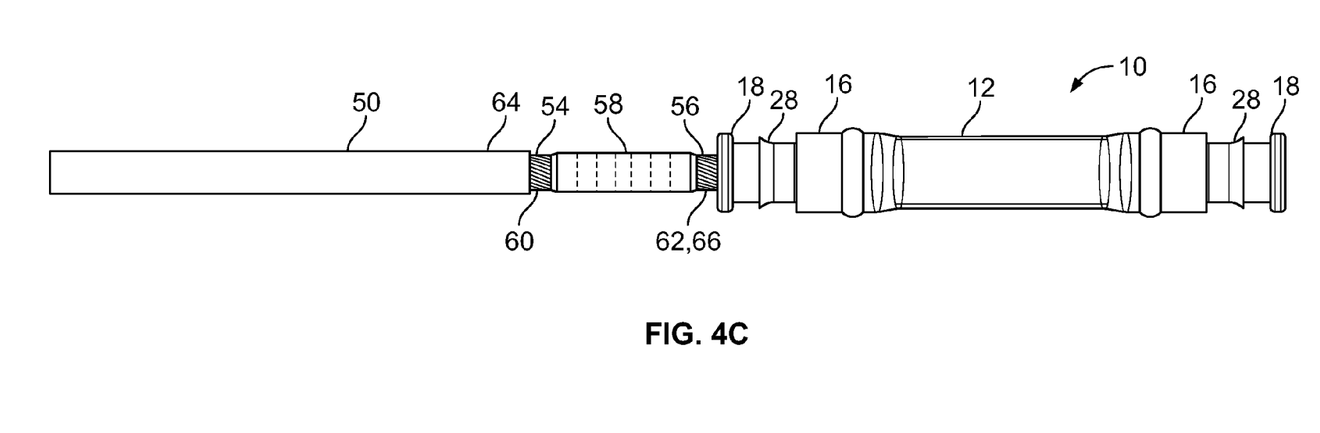
Figure 4D:
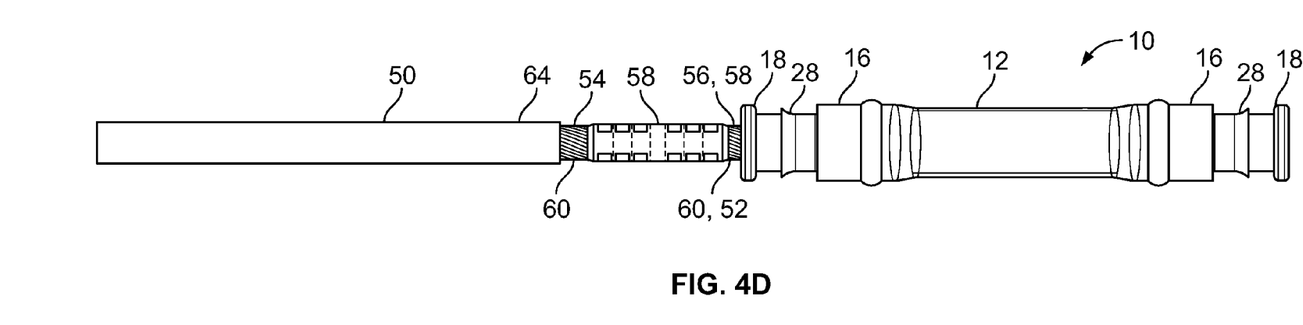
Figures 4E, 4F:
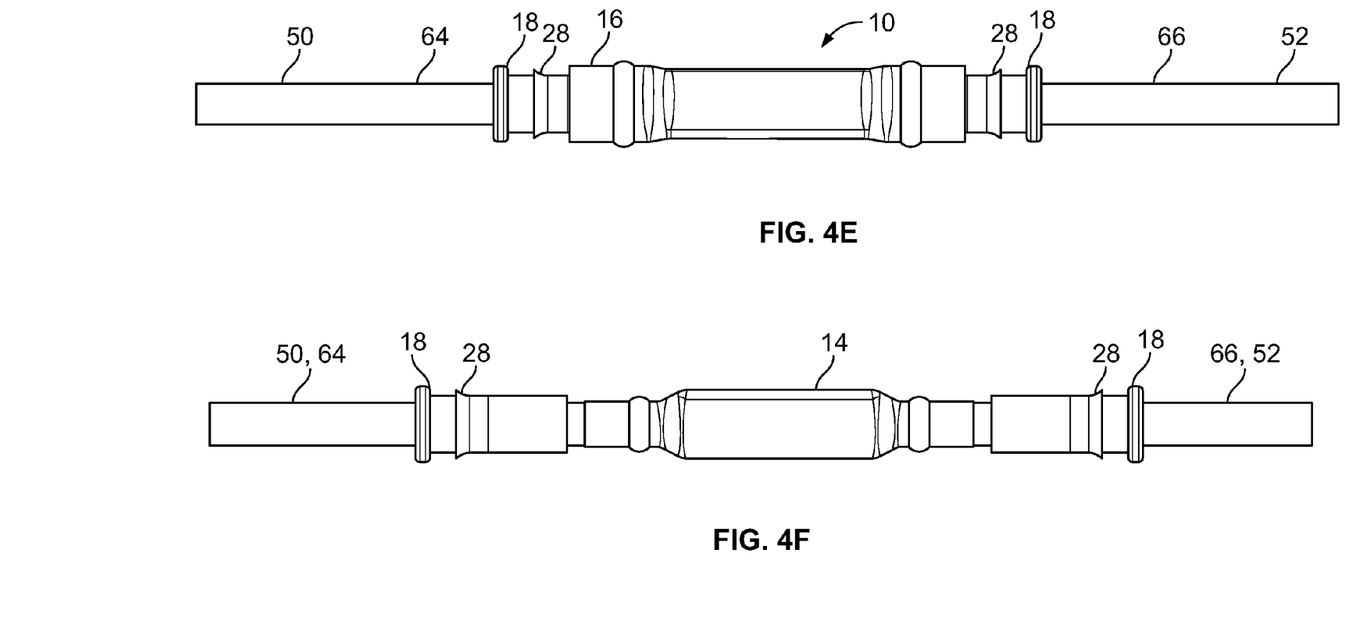
Figure 5A:
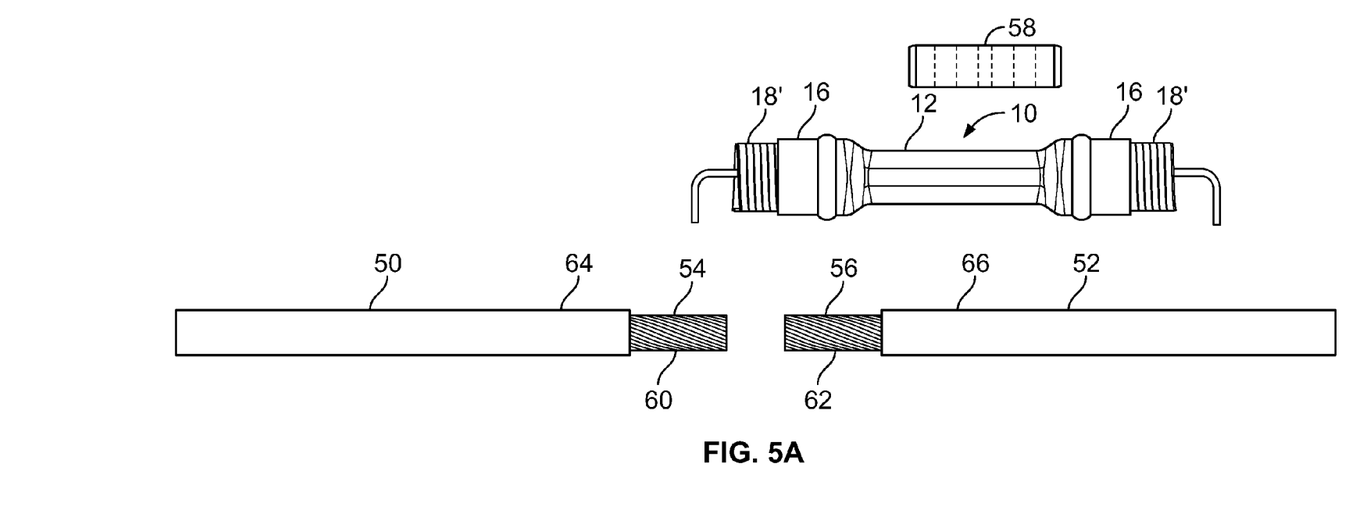
Figure 5B:
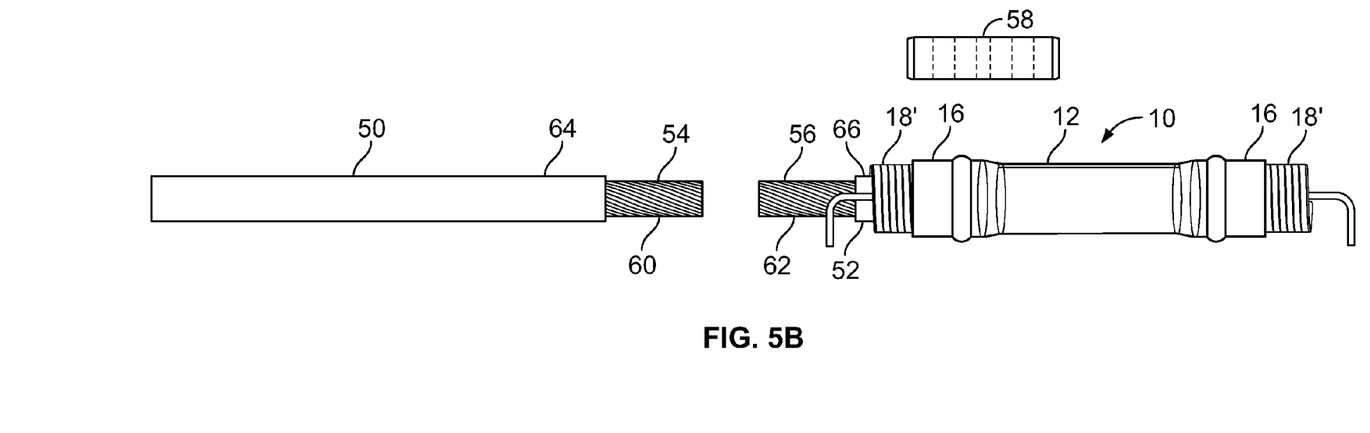
Figure 5C:
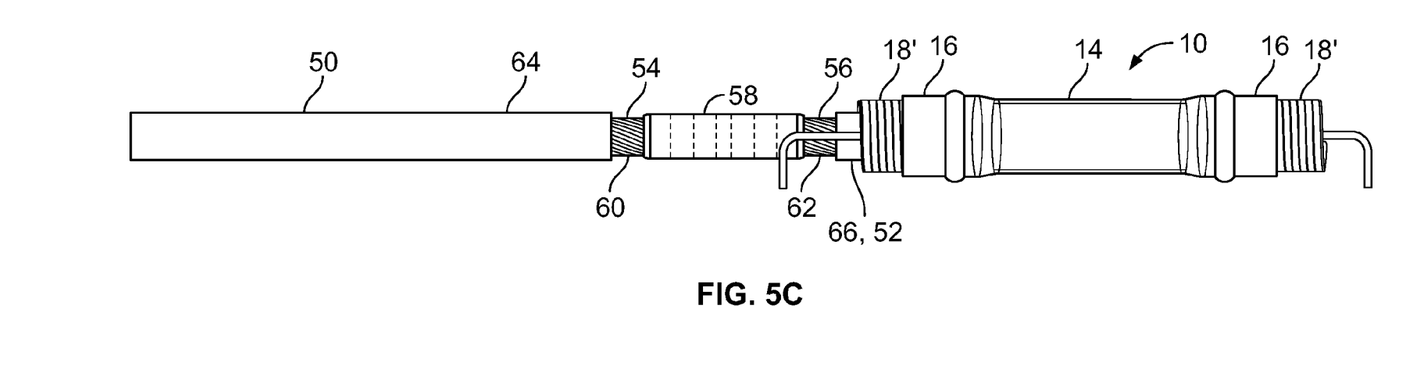
Figure 5D:
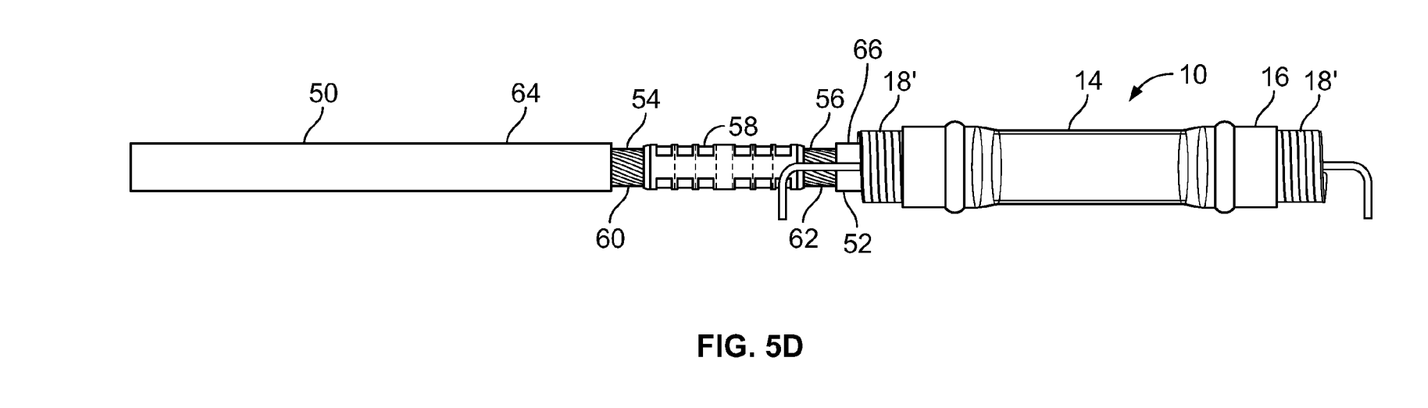
Figure 5E:
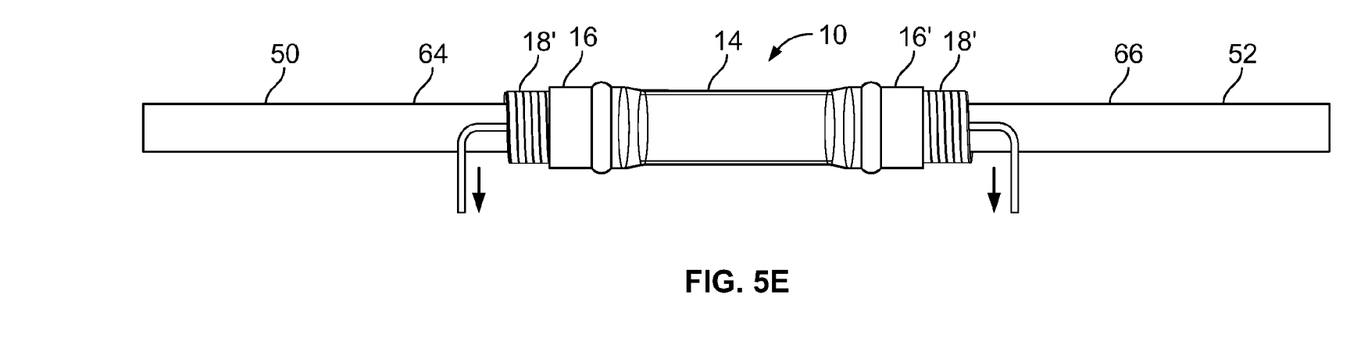
Figure 5F:
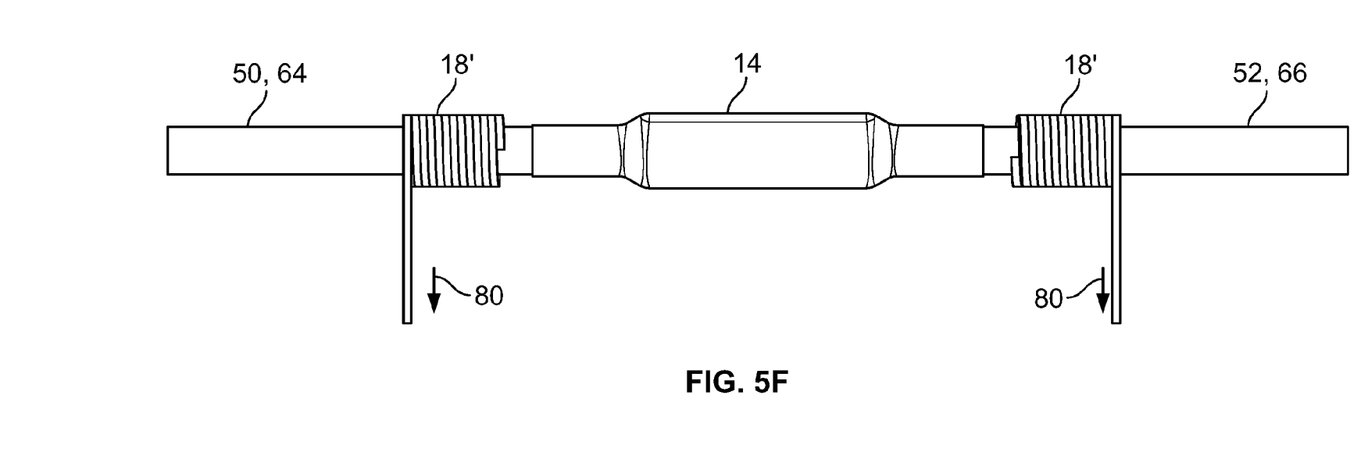

According to an embodiment of the present invention, the support cores 18, 18' are configured to be preassembled at least partially extending into and at least partially protruding from the end sections 16 of the insulating tube 12. In a relaxed state, the end sections 16 are configured to provide an interference to the cable insulation of each of a pair of cables being joined. The central section 14 of the insulating tube 12 is configured to interfere with at least a major portion of the metallic connector of each of the cables being joined (see FIGS. 4D and 5D) to ensure sufficient heat is conducted from the connector to the surrounding environment. Prior to insertion of the support cores 18, 18' the end sections 16 are molded to dimensions having a substantially smaller diameter than the support cores 18, 18'. Only the end sections 16 and not the central section 14 of the insulating tube 12 is configured to be expanded and held open by the support cores 18, 18'. When the support cores 18, 18' are removed (to be described hereinbelow with respect to FIG. 3), the end sections 16 substantially recover to their pre-stretched condition.

According to certain embodiments of the present invention, the two support cores 18, 18' are configured to have a combined length that is significantly shorter than the length of the insulating tube 12.

In a preferred embodiment, the central section 14 of the insulating tube 12 is elliptical in shape and each of the end sections 16 is round in shape. The central section 14 needs to maintain contact to a cable connector to transfer and dissipate heat generated from it. If the central section 14 were circular, it would have to be stretched (opened up) in diameter when storing the device 10 over cable insulation. This requires increasing assembly forces from the installer, which depends on how much stretch is required. The elliptical shape also requires assembly force, but only to bend the ellipse open. No stretching is needed. Preferably the ellipse becomes, substantially circular for large cable insulation diameter.

According to an embodiment of the present invention, the inside "equivalent" circumference 70 of the elliptically shaped central section 14 is close to or larger than the outside circumference 72 of the support cores 18, 18'.

Figure 3:
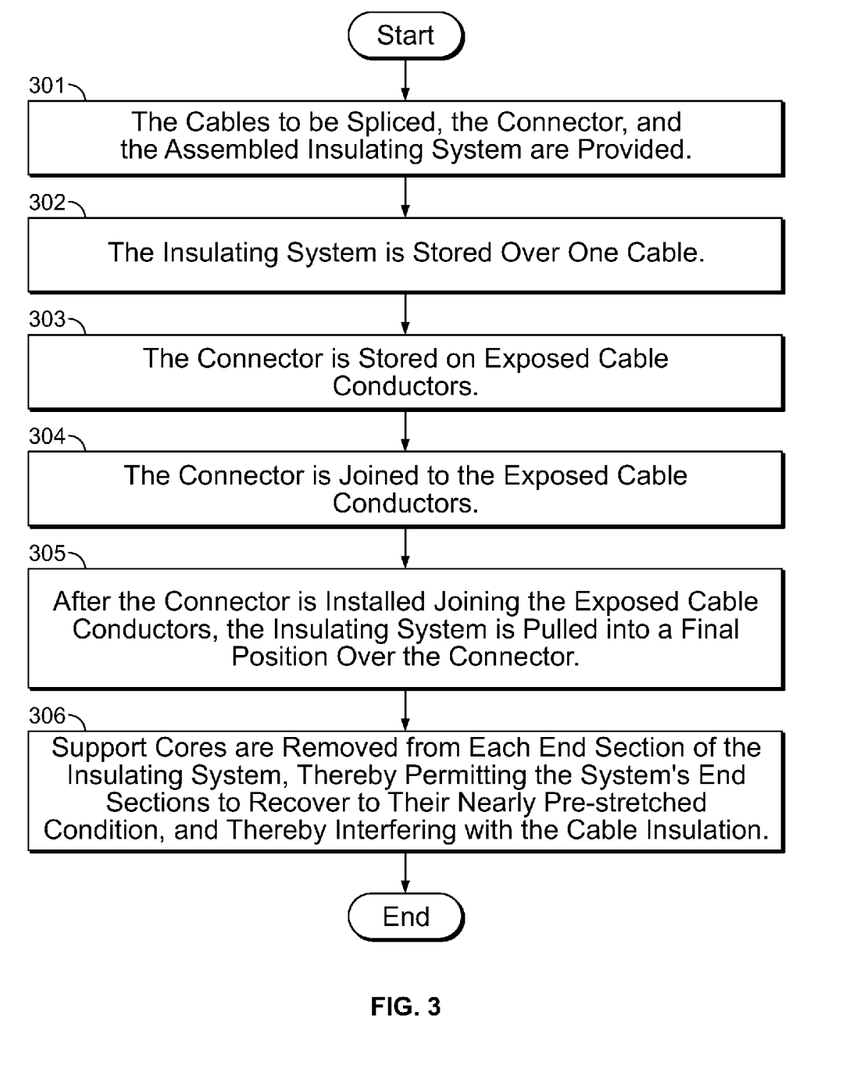
FIG. 3 is a flow diagram illustrating exemplary steps for splicing a pair of insulated cables employing cold-shrinkable splice insulating system of FIGS. 1A-2B, according to an embodiment of the present invention.

FIG. 3 is a flow diagram illustrating exemplary steps for splicing a pair of insulated cables employing cold-shrinkable splice insulating system of FIGS. 1A-2B; FIGS. 4A-4F are a series of assembly diagrams illustrating the corresponding steps of FIG. 3 for the cold-shrinkable splice insulating system employing the solid support cores of FIGS. 1A-1B; and, FIGS. 5A-5F are a series of assembly diagrams illustrating the corresponding steps of FIG. 3 for the cold-shrinkable splice insulating system employing the spiral support cores of FIGS. 2A-2B, according to an embodiment of the present invention. Referring now to FIGS. 3-5F, in step 301, two insulated cables 50, 52 are provided with insulation removed from a portion of one end 54, 56 of each of the cables 50, 52 to provide exposed cable conductors 60, 62. A connector 58 for providing a metallic contact for the cable splices is provided. Also provided is the fully assembled insulating system 10 of the present invention with solid or support cores 18, 18' installed. In step 302, the insulating system 10 is stored over one cable 52. The elliptical insulating tube 12 of the insulating system 10 provides a small amount of interference to the cable 52. This interference requires only a small amount of force to bend insulating tube 12 open to accept the cable 52. In step 303, the connector 58 is stored on both exposed cable conductors 60, 62. In step 304, the connector 58 is joined to the exposed cable conductors 60, 62 of the cables 50, 52, respectively, preferably by crimping.

After the connector 58 is installed joining the exposed cable conductors 60, 62, in step 305, the insulating system 10 is pulled into a final position over the connector 58. Again, the elliptical insulating tube 12 requires only nominal force to bend insulating tube 12 around the cables 50, 52 as it is being moved. In step 306, the support cores 18, 18' are removed from each end 54, 56, thereby permitting the end sections 16 to recover to their nearly pre-stretched condition, and thereby interfering with the cable insulation 64, 66. The sealant material 26 (e.g., mastic, not shown) is trapped between the cable insulation 64, 66 and the end sections 16, thereby providing the necessary environmental seal for the completed assembly. Note: when employing the spiral cores 18', as the spiral cores 18' are removed, they unwind (as indicated by the arrows 80 in FIG. 5F). After most of the support cores 18' unwind, a portion may be left not unwound.

Referring again to FIG. 2A, at least two problems are solved when the plastic film 28 is folded back on itself. The stretched shape memory material (i.e., rubber) of the end sections 16 creates a significant downward (hoop) force on the support cores 18. A person skilled in the art would appreciate that it may be difficult to remove the support cores 18 from the end sections 16 without some sort of lubricant between the support cores 18 and the end sections 16. In certain embodiments, a liquid lubricant may be applied between the support cores 18 from the end sections 16 with or without a double-backed film. It may also be difficult to the sealant material 26 (e.g., mastic) in place as a support core 18 is removed. Sin the preferred embodiment, the double back plastic film 28 alleviates the above described problems as follows. As a support core 18 is removed, the portion of the plastic film 28 in contact with the support core 18 also begins to pull out. The substantially smooth plastic-to-plastic contacting surfaces of the plastic film 28 are very slippery, thereby allowing the support core 18 to slip out. The sealant material 26 remains in place as the plastic film 28 continues to slip out.

The present invention has advantages over prior art insulating cable splice devices. If the spiral support tube embodiment is employed for a splice, the amount of unwinding of the spiral core material is reduced to a minimum. If the solid core embodiment is employed, the length of each core section is limited, thereby requiring only minimal force to remove and requiring only minimal extra linear space. Prior art cold shrinkable splices have an insulating tube supported by a single core which is longer in length than the insulating tube. In certain prior art designs, the insulating tube is supported by two support cores. However, the combined length of the two support cores is longer than the insulating tube. As described above, the two support cores 18, 18', are configured to have a combined length that is significantly shorter than the insulating tube 12.

Further, in two support core-designs of the prior art, the portions of the two support cores inside the insulating tube are in very close proximity to each other. If it were not, the hoop force of the insulating tube may cause each of the support cores to be crushed. This deficiency is overcome in the present invention by the internal geometry of the insulating tube 12 (i.e., its substantially elliptical shape). Referring again to FIGS. 1A and 2A, because the inside "equivalent" circumference 70 of the elliptically shaped insulating tube 12 is close to or larger than the outside circumference 72 of the support cores 18, 18', the hoop force of this larger circumference is not sufficient to crush the support cores 18, 18'. In certain embodiments, the inside equivalent circumference 70 may be larger than the outside circumference 72 of the support cores 18, 18', thus creating no hoop force on the support cores 18, 18'.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. An insulating system for splicing a pair of cables comprising:
   an insulating tube constructed from a shape memory material with a non-expanded central section having a substantially elliptical cross-section and with a pair of end sections each having substantially circular cross-sections; and
   a pair of support cores removably insertable in the end sections for holding the end sections in a stretched configuration,
   wherein, when the insulating system is placed about the cables and the support cores are removed from the end sections, the end sections return to a pre-stretched configuration, thereby completing a splice of the cables.

2. The insulating system of claim 1, wherein the support cores are configured to have a combined length that is substantially shorter than the insulating tube.

3. The insulating system of claim 1, wherein an inside circumference of the elliptically shaped non-expanded central section of the insulating tube is substantially the same as or larger than an outside circumference of the support cores.

4. The insulating system of claim 1, wherein the support cores are substantially circular in cross-section.

5. The insulating system of claim 1, wherein the shape memory material comprises a form of rubber.

6. The insulating system of claim 5, wherein the shape memory material is at least one of Ethylene-propylene-diene-monomer (EPDM) and silicone.

7. The insulating system of claim 1, wherein the support cores have a substantially smooth shape configured to be friction fit into the end sections.

8. The insulating system of claim 7, further comprising a film layered between a corresponding one of the support cores and a corresponding one of the end sections.

9. The insulating system of claim 8, wherein the film is configured to be folded back on itself to form an inner film layer adjacent to the corresponding one of the support cores and to form an outer film layer adjacent to the corresponding one of the end sections.

10. The insulating system of claim 9, wherein the inner film layer is adhered to the corresponding one of the support cores with an adhesive.

11. The insulating system of claim 8, wherein the film comprises mylar.

12. The insulating system of claim 8, wherein the film is a single layer located between a support core and an end section on each end of the splice, the single layer film folded into an inner diameter of the support core and secured therein.

13. The insulating system of claim 1, wherein the support cores have a substantially spiral shape configured to be fully wound and inserted into the end sections.

14. The insulating system of claim 1, wherein the end sections each comprise a hollow lip extending about a portion of an inner circumference of the end sections.

15. The insulating system of claim 14, further comprising a sealant material configured to be received between each of the support cores and the insulating tube.

16. A method for splicing cables, comprising the steps of:
   providing an insulating system comprising an insulating tube constructed from a shape memory material with a non-expanded central section having a substantially elliptical cross-section, and with a pair of end sections each having substantially circular cross-sections, and a pair of support cores removably insertable in each of the end sections for holding the end sections in a stretched configuration;
   placing the insulating system about the cables; and
   removing the support cores from the end sections,
   wherein the end sections return to a pre-stretched configuration, thereby completing a splice of the cables.

17. The method of claim 16, wherein, when the support cores are removed from the end sections, a sealant material is trapped between each of the insulated portions of the cables and the end sections, thereby providing an environmental seal for the spliced cables.

18. The method of claim 16,
wherein the support cores have a substantially smooth shape and a film layered between a corresponding one of the support cores and a corresponding one of the end sections,
wherein the film is configured to be folded back on itself, and
wherein when a support core is removed, a portion of the film in contact with the support core slips out.

19. The method of claim 18, wherein the sealant material remains in place as the film slips out.

20. The method of claim 18, wherein the support cores have a substantially spiral shape configured to be unwound when removed from the end sections.

21. An insulating system for splicing a pair of cables, comprising:
an insulating tube constructed from a shape memory material with a central section and with a substantially elliptical cross-section and a pair of end sections with substantially circular cross-sections;
a pair of support cores removably insertable in the end sections for holding the end sections in a stretched configuration; and
a film inserted between a corresponding one of the support cores and a corresponding one of the end sections, wherein the film is to be folded back on itself to form an inner film layer adjacent to the corresponding one of the support cores and to form an outer film layer adjacent to the corresponding one of the end sections,
wherein, when the insulating system is placed about the cables and the support cores are removed from the end sections, the end sections return to a pre-stretched configuration, thereby completing a splice of the cables.

22. The insulating system of claim 21, wherein the inner film layer is adhered to the corresponding one of the support cores with an adhesive.

23. The insulating system of claim 21, wherein the film comprises mylar.

24. The insulating system of claim 21, wherein the support cores have a substantially spiral shape configured to be fully wound and inserted into the end sections.

25. The insulating system of claim 21, wherein the end sections each comprise a hollow lip extending about a portion of an inner circumference of the end sections.

26. The insulating system of claim 25, further comprising a sealant material configured to be received between each of the support cores and the insulating tube.

27. The insulating system of claim 21, wherein the support cores are configured to have a combined length that is substantially shorter than the insulating tube.

28. The insulating system of claim 21, wherein an inside circumference of the elliptically shaped central section of the insulating tube is substantially the same as or larger than an outside circumference of the support cores.

29. The insulating system of claim 21, wherein the support cores are substantially circular in cross section.

30. The insulating system of claim 21, wherein the shape memory material comprises a form of rubber.

31. The insulating system of claim 30, wherein the shape memory material is at least one of Ethylene-propylene-diene-monomer (EPDM) and silicone.

32. A method for splicing cables, comprising the steps of:
providing an insulating system comprising an insulating tube constructed from a shape memory material with a central section and with a substantially elliptical cross-section, a pair of end sections with substantially circular cross-sections, and a pair of support cores removably insertable in each of the end sections for holding the end sections in a stretched configuration;
placing the insulating system about the cables; and
removing the support cores from the end sections,
wherein the support cores have a film layered between a corresponding one of the support cores and a corresponding one of the end sections,
wherein the film is configured to be folded back on itself,
wherein when a support core is removed, a portion of the film in contact with the support core slips out, and
wherein the end sections return to a pre-stretched configuration, thereby completing a splice of the cables.

* * * * *